US012678756B2

(12) United States Patent
Reichel

(10) Patent No.: US 12,678,756 B2
(45) Date of Patent: Jul. 14, 2026

(54) MIXING DEVICE FOR PRODUCING A POWDER MIXTURE

(71) Applicant: EOS GmbH Electro Optical Systems, Krailling (DE)

(72) Inventor: Thomas Reichel, Germering (DE)

(73) Assignee: EOS GmbH Electro Optical Systems, Krailling (DE)

( * ) Notice: Subject to any disclaimer, the term of this patent is extended or adjusted under 35 U.S.C. 154(b) by 728 days.

(21) Appl. No.: 18/084,794

(22) Filed: Dec. 20, 2022

(65) Prior Publication Data

US 2023/0191347 A1 Jun. 22, 2023

(51) Int. Cl.
| | |
|---|---|
| *B01F 35/00* | (2022.01) |
| *B01F 23/60* | (2022.01) |
| *B01F 33/40* | (2022.01) |
| *B01F 35/71* | (2022.01) |
| *B22F 12/58* | (2021.01) |
| *B29C 64/314* | (2017.01) |
| *B33Y 40/00* | (2020.01) |

(52) U.S. Cl.
CPC .......... *B01F 35/7162* (2022.01); *B01F 23/69* (2022.01); *B01F 33/4061* (2022.01); *B22F 12/58* (2021.01); *B29C 64/314* (2017.08); *B33Y 40/00* (2014.12)

(58) Field of Classification Search
CPC . B24C 7/0046; B24C 7/0038; B01F 35/7162; B01F 33/4061; B01F 33/4062; B01F 33/407; B22F 12/58
See application file for complete search history.

(56) References Cited

U.S. PATENT DOCUMENTS 2,759,266 A * 8/1956 Cassani .............. A61B 17/3203
433/88
3,647,188 A 3/1972 Solt
(Continued)

FOREIGN PATENT DOCUMENTS

DE 102010043166 A1 5/2012
DE 102020208252 A1 1/2022
(Continued)

OTHER PUBLICATIONS

European Search Report for corresponding Application No. EP 21216130.1 dated Jun. 30, 2022, 9 pages.

*Primary Examiner* — Anshu Bhatia
(74) *Attorney, Agent, or Firm* — Polsinelli PC

(57) ABSTRACT

A mixing device serves for producing a powder mixture of a first powder component and at least one second powder component for an additive manufacturing device. The mixing device includes a first container for receiving the first and/or the second powder component, where a discharge opening for discharging the first and/or the second powder component is provided at a lower boundary of the first container, and a second container for receiving the first and/or the second powder component. The second container is designed to be at least partially open towards an upper side. The first and second container each include at least one fluidization zone for introducing a gas into the first and second container. The mixing device further includes a powder conduit that connects to the discharge opening of the first container and is guided into the second container.

19 Claims, 5 Drawing Sheets

(56)     References Cited

U.S. PATENT DOCUMENTS 3,852,918 A  *  12/1974  Black ................... B24C 7/0053
                                                          451/99
2009/0169664  A1      7/2009  Cox
2012/0107438  A1      5/2012  Bokodi et al.
2017/0189867  A1*    7/2017  Donnet ................. A61C 3/025

FOREIGN PATENT DOCUMENTS

EP          2447047  A1      5/2012
EP          2450177  A1      5/2012
KR        910002523  B1      4/1991

* cited by examiner

Fig. 4a
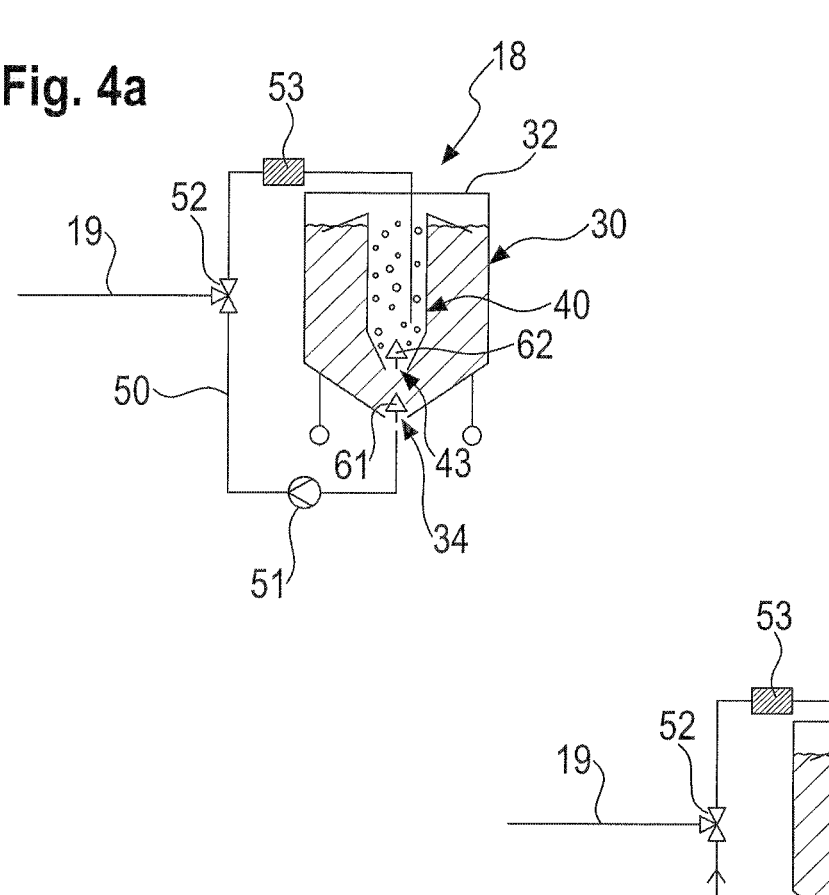
Fig. 4b
Fig. 4c
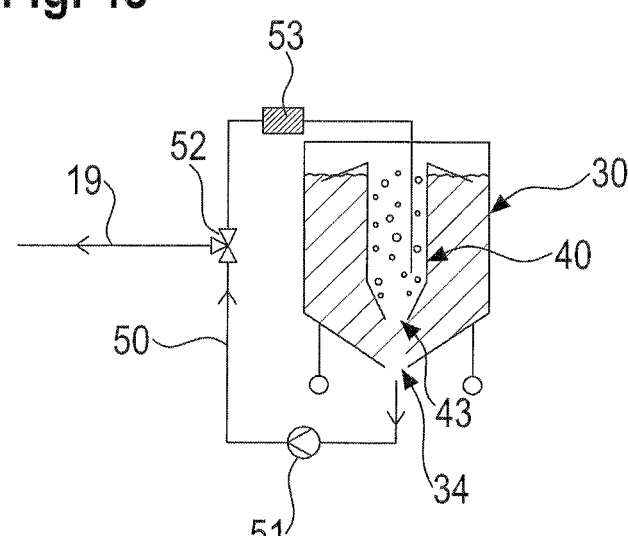

MIXING DEVICE FOR PRODUCING A POWDER MIXTURE

TECHNICAL FIELD OF THE INVENTION

The present invention relates to a mixing device for producing a powder mixture, an additive manufacturing device for producing a three-dimensional object using such a powder mixture and an additive manufacturing device with such a mixing device, and a method for producing a powder mixture.

BACKGROUND OF THE INVENTION

Devices and methods for additively producing a three-dimensional object by selectively solidifying a building material layer by layer are used, for example, in rapid prototyping, rapid tooling or additive manufacturing. An example of such a method is known as "selective laser sintering or laser melting". In this process, a thin layer of a building material in powder for is repeatedly applied and the building material in each layer is selectively solidified by selectively irradiating locations that correspond to a cross section of the object to be manufactured with a laser beam.

Usually, in such a manufacturing process, a portion of the powder used as the building material is left over, for example, in the form of powder surrounding the manufactured object or excess powder that was supplied to an overflow container during a layer application by the recoater. Such powder, which has already been used in a previous manufacturing process, is also referred to as used powder. To increase the efficiency, in particular the cost efficiency, of the manufacturing process, it may be desirable to use a portion of used powder as the building material. For this purpose, the used powder is usually mixed with so-called new powder, i.e. powder that has not yet been used in a previous manufacturing process, and made available as a building material for a further manufacturing process.

It may also be desirable or necessary in an additive manufacturing process to mix a powder used as a building material from different powder components according to specific specifications, for example with regard to chemical and/or physical properties.

In both cases, it is necessary to achieve a powder mixture that is as homogeneous as possible from the different powder components, i.e. the used powder and new powder, or chemically and/or physically different powder components, in order to obtain a three-dimensional object with good, in particular as homogeneous as possible, component properties.

DE 10 2010 043 166 A1 describes a device for mixing powder for an additive manufacturing device. The container in which the powder is mixed comprises a fluid-permeable lower plate and a stirring device in the form of a stirring tool.

US 2009/0169664 A1 describes a system for mixing a powder for a laser sintering machine, wherein a new powder and a used powder are mixed in a mixing container. In order to mix the powders, they are circulated in a circuit.

EP 2 450 177 A1 describes a powder handling system for a 3D printer, the system comprising a plurality of powder holding containers and a vacuum pump to convey powder between the powder holding containers. As the powder containers, there are provided a metering container to dispense an amount of powder sufficient for a layer application, and an external powder container to provide the powder. The external powder container comprises a lid and a conical wall, as well as an internal nozzle through which powder is discharged upwards.

SUMMARY OF THE INVENTION

It is an object of the present invention to provide an alternative or improved mixing device or an alternative or improved method of producing a powder mixture for an additive manufacturing device, in which, in particular, the homogeneity of the powder mixture can be improved and/or which enables powder components to be mixed as simply as possible and/or reproducibly and/or at least partially automatically.

A mixing device according to the invention serves for producing a powder mixture of a first powder component and at least one second powder component for an additive manufacturing device in which a three-dimensional object can be produced by selectively solidifying, layer by layer, a building material comprising the powder mixture. The mixing device comprises a first container for receiving the first and/or the second powder component, wherein a discharge opening for discharging the first and/or the second powder component is provided at a lower boundary of the first container, and a second container for receiving the first and/or the second powder component, wherein the second container is designed to be at least partially open towards an upper side.

In the following, the powder mixture is described as a mixture of the first and second powder components. However, the invention is not limited to the use of two powder components; rather, three or more powder components can also be provided for use with, and in particular mixed by, the mixing device. Preferably, the first and second powder components and any further powder components differ from one another in their chemical and/or physical properties. For example, the first powder component can be a used powder which has already been left over as an unsolidified and/or excess powder in a previous building process, and the second powder component can be a new powder.

Preferably, the lower boundary of the first container or the second container is a container bottom of the respective container. Preferably, the lower boundary of the first container or the second container is provided opposite to a container lid of the first container (see below) or the upper side of the second container.

Further, the mixing device comprises at least one fluidization zone for introducing a gas into the mixing device. The first container (optionally additionally also the second container) comprises at least one fluidization zone. The fluidization zone is a section in the first (or also in the second) container, in which the first and/or the second powder component is subjected to a gas flow, which is supplied into the first (or into the second) container by a gas introduction element. Preferably, the gas introduction element comprises a grid and/or a porous plate arranged between the container wall and the outlet of the gas introduction element. Both the grid and the porous plate can be made of plastic or metal, for example. The grid and/or the porous plate can abut a container wall of the respective container. In particular, the grid and/or the porous plate can be attached to the respective container wall. Preferably, the fluidization zone(s) is/are each formed by a cavity separated from the first or second container by a gas introduction element, in particular a grid and/or a porous plate. Further preferably, the grid and/or the porous plate is quadrangular. In particular, the grid and/or porous plate can comprise a series of, preferably parallel, quadrangular gaps. The main direction of the gaps can have a certain angle to the main direction of the quadrangular grid or the quadrangular porous plate. In particular, the gaps can be parallel or perpendicular to the main direction of the grid or porous plates.

The mixing device further comprises a powder conduit that connects to the discharge opening of the first container and is guided into the second container. The powder conduit is preferably provided substantially outside the first container. "Substantially outside the first container" means here that the powder conduit is provided outside the first container over the majority of its conduit length, and in particular only the section of the powder conduit which is guided into the second container is provided inside the first container.

The powder conduit thus forms, for example as a pipeline, a powder-carrying connection of the discharge opening of the first container with the interior of the second container. This makes it possible, for example, to convey the first and/or second powder component in a circuit, wherein, for example, the powder component(s) passes out from the second container by fluidization via the upper side of the second container, which is open at least in sections, and enters the first container, and from there again via the powder conduit back into the second container. This conveying in a circuit can lead, for example, to a good mixing of the two powder components. Overall, the mixing device according to the invention can thus provide a device for mixing different powder components, with which a mixing process can be carried out in a simple manner and/or at least partially automatically and/or as reproducibly as possible and/or with which a powder mixture that is as homogeneous as possible can be produced.

Preferably, the second container is arranged substantially within the first container. Thus, according to this preferred embodiment, the first container is designed as an outer container and the second container is designed as an inner container, wherein the second container can also project over the first container, for example. This makes it possible, for example, to provide a mixing device which is as compact as possible, i.e. with minimum space requirements, and/or to make the operation and/or construction of the mixing device as simple as possible, since the powder passing out of the second container by fluidization passes directly into the first container and thus, for example, no further structural elements, such as powder conduits, are required as an additional connection between the two containers.

Further preferably, the second container is at least partially adjacent to the first container. Still further preferably, the second container is at least partially attached to the first container. For example, at least one wall of the second container can, in particular fully or partially, abut, preferably be attached, to a wall of the first container, or the first and second containers can share a common wall region over a partial area. In addition, structural elements for attachment of the second container in the first container can be provided, which structural elements connect the two containers. In a preferred embodiment, the second container is spaced apart from the first container in at least one spatial direction. By spacing the two containers apart from one another in at least one spatial direction, improved mixing of the two powder components is possible. Preferably, the fluidization zone(s) are additionally arranged where the containers are spaced apart. This arrangement makes it possible, for example, to achieve improved mixing of the two powder components and/or good conveying in a circuit (see above).

Preferably, the first container is closable towards an upper side by a container lid and the second container is provided within the first container in such a way that an upper boundary of the second container is spaced apart from the container lid of the first container. For example, the upper boundary of the second container can be formed as a container rim of the second container. Further preferably, the powder conduit extends through the container lid of the first container into the second container.

By the fact that the second container is at least partially open towards an upper side and its upper boundary is spaced apart from the container lid of the first container, it is possible, for example, that the first and/or the second powder component can pass over the upper boundary of the second container and enter the first container. This can be facilitated or enabled by the first and/or second powder component being transferred to a fluid-like state by the introduction of the gas. Further, transferring the powder in a fluid-like state can be accomplished more quickly and/or more completely by induced moistening of the first and/or the second powder component. Putting the powder into a fluid-like state can, for example, improve a conveyance of the powder in a circuit, i.e. from the second container into the first container and from there through the powder conduit back into the second container, and thus lead to a particularly good, in particular homogeneous, mixing of the powder or mixing of the two or more powder components.

Preferably, a powder opening for discharging the first and/or the second powder component is provided at the lower boundary, for example a container bottom, of the second container. This makes it possible, for example, when supplying the (mixed) powder to the additive manufacturing device or a storage container, to remove the powder present in the mixing device as completely as possible, i.e. in particular also to empty the second container as completely as possible.

Further, the mixing device preferably comprises at least a first closure device that is designed to close and/or open the discharge opening of the first container. Alternatively or additionally, the mixing device preferably comprises at least a second closure device that is designed to close and/or open the powder opening of the second container. The first and/or second closure device can be designed, for example, as a powder valve and/or as a pinch valve and/or as a cone valve. Further preferably, the first closure device and the second closure device are designed to close and/or open the respective discharge opening or powder opening depending on an operating state of the respective other closure device and/or depending on a defined operating mode of the mixing device. An operating state designates in particular a state in which the discharge opening or powder opening is closed or uncovered, i.e. opened, by the respective closure devices. In particular, powder can escape from the respective container through the discharge opening or powder opening when the respective opening is open. Accordingly, no powder can escape through the respective opening if it is closed by the respective closure device. Further preferably, the first and/or second closure device is designed to adjust a powder flow (powder volume flowing through per unit time) therethrough. Coordinated control of the discharge opening and the powder opening contributes to the realization of a circuit of the powder mixture. The first and/or the second powder component and/or the powder mixture can be conveyed in a circuit. For example, the first and/or the second powder component and/or the powder mixture can be conveyed in a circuit from the second container into the first container and from there through the powder conduit back into the second container. Conveying in a circuit leads to a particularly good, in particular homogeneous, mixing of the two or more powder components. Overall, the closure devices thus enable, for example, different processes to be carried out in or by means of the mixing device.

Preferably, with regard to the closure devices, at least one of the following operating states is provided in the mixing device:

a first state in which the discharge opening of the first container is open and the powder opening of the second container is closed;

a second state in which the discharge opening of the first container is closed and the powder opening of the second container is open;

a third state in which the discharge opening of the first container and the powder opening of the second container are both closed (first variant) or are both open (second variant).

Preferably, the operating states of the mixing device are assigned to different operating modes of the mixing device. For example, a "filling" operating mode can be provided, in which the first and/or second powder components are supplied to the first and/or second container, i.e. the container(s) is/are filled. In this operating mode, the discharge opening of the first container is preferably closed, so that no powder escapes through it. In doing so, the powder opening of the second container can be either opened, i.e. uncovered, in order to permit an exchange of powder between the second and the first container. This corresponds to the above second operating state. Alternatively, the powder opening of the second container can also be closed. In this case, for example, only the second container is filled. This corresponds to the above first variant of the third operating state.

Further, for example, a "mixing" operating mode of the mixing device can be provided, in which the first and second powder components are mixed together. In this operating mode, the discharge opening of the first container is preferably closed and the powder opening of the second container is preferably open. The first and/or second powder components flows/flow from the second container into the first container and remains/remain in the first container (as long as the discharge opening of the first container is closed). This corresponds to the above second operating state.

Mixing preferably occurs in the fluidization zone(s) of the first and/or second container. Mixing can be realized or facilitated by introducing a gas into the fluidization zone(s). Alternatively or additionally, mixing is improved and/or realized by a suitable inclination of a lower boundary of the first and/or the second container. In this operating mode, a degree of fluidization of the first and/or the second component or the powder mixture can optionally be determined. The degree of fluidization can be determined based on the viscosity and/or on the moisture content and/or on the temperature of the first and/or the second powder component and/or the powder mixture. The discharge opening and/or the powder opening are opened, for example, when the first and/or second powder component and/or the powder mixture has/have reached a certain degree of fluidization. Opening of the powder opening of the second container with the discharge opening of the first container being open corresponds to the second variant of the above third operating state. When a certain degree of fluidization is reached, it is possible, for example, to switch from the "mixing" operating mode to the "conveying" operating mode.

Further, for example, a "conveying" operating mode of the mixing device can be provided, in which the first and/or second powder component and/or the powder mixture is supplied to the additive manufacturing device and/or to a storage container. In this operating mode, both the discharge opening and the powder opening are preferably open, for example, in order to allow the mixing device to be emptied as completely as possible. This corresponds to the above second variant of the third operating state.

Further operating modes result from the combination of the "filling", "mixing" and "conveying" operating modes. For example, "mixing" and "filling" can be combined in such a way that the second container is filled with at least one powder component, while the powder components are mixed in the first container. In this case, the powder opening of the second container can be open and the powder component(s) passes through the second container into the first container (this corresponds to the above second operating state). Alternatively, the powder opening of the second container can be closed. In doing so, the discharge opening can also be closed further (this corresponds to the first variant of the third operating state above). With the powder opening closed, the second container is overfilled and the powder component(s) enter(s) the first container via the deflecting elements of the second container. Furthermore, it is possible to combine the "filling" operating mode and the "mixing" operating mode in such a way that the first and/or the second powder component(s) are mixed by adjusting the discharge speed of the powder component(s) through the powder opening of the second container and the filling speed into the second container. If the filling speed exceeds the discharge speed, a return of the powder component(s) at the powder opening of the second container partially takes place and thereby the mixing of the powder component(s) can be realized. Mixing of the powder components by relative adjustment of the discharge speed and the filling speed is preferably facilitated by a funnel-shaped design of the powder opening. Overall, the operating modes are preferably combined in such a way that the mixing and the provision of the first and/or the second powder component and/or the powder mixture is implemented by conveyance in a circuit. The operating modes are preferably characterized by certain operating parameters. For example, in the "filling" operating mode, an inlet speed of the powder through the powder conduit can be defined as an operating parameter. This corresponds to the definition of the filling speed of the second container. In the "mixing" operating mode, a gas pressure at which the gas is introduced into the fluidization zone(s) can be defined as an operating parameter. Further, the introduction of the gas can be at time intervals and can be timed, the time intervals being understood to be operating parameters both in terms of duration and frequency. Other operating parameters in the "mixing" operating mode can be the duration of the time intervals in which the gas is introduced and the cycle between one time interval and the next. In the "conveying" operating mode, a discharge speed of the powder from the first and/or from the second container can be operating parameters. The operating parameters are not necessarily coupled to an operating mode, but can be defined for different operating modes. For example, the discharge speed from the second container can also be an operating parameter in the "mixing" operating mode. In addition, the inlet speed of the powder through the powder conduit or the filling speed of the first and/or the second container can also be operating parameters in the "conveying" operating mode, in particular if the "conveying" and the "filling" are implemented in a circuit.

Preferably, a lower region of the first container, in particular its lower boundary, and/or the lower region of the second container, in particular its lower boundary, is or are designed to be at least partially funnel-shaped. Thus, for example, a discharge of the first and/or second powder component through the discharge opening of the first container and/or the powder opening of the second container can be simplified and/or the powder can be removed substantially completely from the respective container. In particular, the funnel-shaped design can, for example, prevent poorly mixed regions from forming in the respective container. Furthermore, the mixing of the powder component can be realized or facilitated by a suitable funnel-shaped design, in particular by a suitable inclination of the lower funnel-shaped boundary of the first and/or the second container. The funnel-shaped design can, for example, be constructed in such a way that a return of the first and/or the second powder component takes place at least partially in the lower region of the first and/or the second container. A return flow can also be realized and/or facilitated by the combination of a suitable (funnel-shaped) design of the lower region of the first and/or the second container and a relative adjustment of the discharge speed from the powder opening or from the discharge opening and the filling speed of the first and/or the second container.

Preferably, a lower region of the first container, in particular the discharge opening, is connectable to a conveyor module or is connected thereto. The conveyor module can in particular comprise a pump, preferably a pneumatic powder pump, for conveying the first and/or second powder component. The connection of the discharge opening to the conveyor module can in particular mean a connection by means of the powder conduit. The pump is preferably designed for intermittent conveying of the powder.

Alternatively, the pump can also be designed for continuous conveying of the powder. Alternatively to the integral provision of a conveyor module with the mixing device, this can also be provided separately from the mixing device, i.e. as an external conveyor module. For example, the conveyor module can be part of a docking station of the manufacturing device, the docking station being configured to receive the mixing device.

Preferably, at least one deflecting element is provided on the second container, which deflecting element extends substantially from a container wall and/or the upper boundary of the second container towards at least one nearest wall of the first container. Further preferably, the deflecting element is inclined starting from the container wall and/or the upper boundary of the second container towards the lower boundary of the first container and/or towards the discharge opening of the first container. The deflecting element can, for example, provide a more uniform outflow of the powder fluidized in and exiting the second container, particularly by deflecting the powder exiting the second container toward the wall of the first container, which may, for example, improve the mixing of the powders. In particular, by providing the deflecting element, a core flow of the conveyed powder within the first and/or second container can be counteracted. Preferably, the deflecting element extends around substantially the entire circumference of the second container. This means that the deflecting element surrounds the second container in a sectional plane, in particular a horizontal sectional plane, essentially without any gaps.

Preferably, the first and/or second container can be filled manually and/or partially automatically and/or automatically, i.e. is/are fillable manually and/or partially automatically and/or automatically, in particular via the powder conduit. For this purpose, the powder conduit extending into the second container can, for example, have a filling opening outside the containers, via which the first and/or second powder component is supplied, for example, from an external powder supply, or the powder conduit itself can be connected to such an external powder supply, or a separately provided supply conduit can extend into the first and/or second container or connected, for example via a (powder) valve, to the powder conduit. Preferably, during a (partially) automatic filling of the first and/or second container, sensors are provided for detecting a powder filling level in the respective container, in order, for example, to be able to ensure a defined powder quantity or filling level height in the respective container and/or a defined mixing ratio of the powder components. Alternatively or additionally, a, in particular manual, filling of the container(s) can take place by opening the container lid of the first container and the powder filling level can be checked, for example through a viewing window in the first and/or second container. The filling process described here preferably corresponds to the "filling" operating mode of the mixing device described above.

Alternatively or additionally, the powder conduit is preferably connected to a removal conduit for removing the powder mixture or the first and/or second powder component from the mixing device. In particular, the removal conduit can extend into the additive manufacturing device, for example to a storage container for receiving the pulverulent building material used in the manufacture of a three-dimensional object. The removal conduit, for example a pipeline, can be in communication with the powder conduit of the mixing device, for example via a valve. Alternatively, the removal conduit can, for example, be directly connectable to the discharge opening of the first container. A process of removing the powder mixture from the mixing device is preferably a "conveying" operating mode of the mixing device described above.

Preferably, the mixing device further comprises a moistening device for moistening the first and/or second powder component, for example in the powder conduit. The moistening device can comprise, for example, a container with a fluid in which an sprayer is located, and a powder container in which the powder to be moistened is located. A fluidization plate is arranged in the powder container, for example, through which a gas is introduced into the powder. In doing so, the gas is preferably circulated, wherein it is moistened when passing through the container comprising the liquid, i.e. the moisture content of the gas is increased, and when passing through the powder container it releases this moisture back to the powder. Preferably, a filter system for cleaning the gas of powder particles is further provided in the circuit in which the gas is guided. A powder component mixed in the mixing device can consist, at least in part, of the powder moistened as described above. The powder container in which the moistening of the powder takes place can be connected or connectable to the mixing device, for example to the powder conduit of the mixing device.

Alternatively or in addition to the provision of a moistening device, the gas introduced through the at least one of the fluidization zones can have a certain moisture content and thus serve for moistening the first and/or the second powder component or the powder mixture, respectively, or the first and/or the second container of the mixing device can be designed as a powder container of a moistening device described above. The moistening of the powder can, for example, prevent or at least reduce discharge and/or electrostatic charging of small powder particles during mixing and conveying of the powder components. The electrical charging can increase the miscibility and/or fluidity of the powder components and/or the powder mixture.

Optionally, the mixing device comprises a sensor arrangement configured to determine a degree of fluidization of at least one of the powder components and/or of the powder mixture. Further preferably, the sensor arrangement is connected to a transmission unit, which can transmit the measured degree of fluidization. This transmission unit can be integrated in the sensor unit, or the sensor arrangement can additionally be suitable for transmitting the determined degree of fluidization. The degree of fluidization can be determined based on a measurement of the viscosity and/or the moisture content and/or the temperature of the powder components and/or the powder mixture. Accordingly, the sensor arrangement can comprise a viscometer (rheometer) and/or a moisture sensor and/or a temperature sensor.

Furthermore, the mixing device optionally comprises a control unit. The control unit is connected to at least one, preferably several, particularly preferably all, other components of the mixing device. In particular, the control unit is preferably connected to the sensor arrangement. The control unit can, for example, be provided (by the transmission unit or by the sensor arrangement) with the degree of fluidization. The control unit can further be adapted to compare the determined degree of fluidization with a certain threshold value or to calculate the relative change of the degree of fluidization over a certain time interval. Depending on the degree of fluidization, in particular depending on the result from this comparison or from this calculation, the control unit can generate commands and transmit them to the other components so that the operating parameters of the other components are changed.

Preferably, the mixing device is designed to be movable, in particular displaceable. This makes it possible, for example, to provide powder mixtures for various additive manufacturing devices by means of the mixing device, since the mixing device can be brought to the respective manufacturing device in a simple manner.

An additive manufacturing device according to the invention serves for manufacturing a three-dimensional object by selectively solidifying a building material layer by layer. The building material comprises a powder mixture provided by a mixing device described above. Alternatively or additionally, the manufacturing device comprises and/or is connected to a mixing device described above. Thus, the above-described effects of the mixing device are also achievable, for example, when the powder mixture is used in an additive manufacturing device or in an additive manufacturing process.

A method according to the invention serves for producing a powder mixture of a first powder component and at least one second powder component in a mixing device. In the method, the first and/or the second powder component is/are received by a, i.e. in a, first container, wherein a discharge opening for discharging the first and/or the second powder component is provided at a lower boundary of the first container, and the first and/or the second powder component is received by a, i.e. in a, second container, wherein the second container is designed to be at least partially open towards an upper side. The first container has at least one fluidization zone for introducing a gas into the first container, and the mixing device further comprises a powder conduit which is or can be connected to the discharge opening of the first container and is or can be guided into the second container. Thus, for example, a method for producing a powder mixture is provided, with which the same effects can be achieved as in the mixing device described above. It should be noted here again that the method can also be carried out with more than two powder components. The second container can also comprise a fluidization zone, as described in detail above.

Preferably, the process comprises at least one of the following steps, preferably all of the following steps:

a) introducing a gas through at least one fluidization zone into the first container and optionally through at least one other fluidization zone into the second container;

b) manually or and/or partially automatically and/or automatically introducing the first and/or second powder component into the first and/or second container;

c) mixing the first and second powder components from the first and/or second container, in particular in combination with step a);

d) discharging the first and/or second powder component through the discharge opening of the first container from the first container via the powder conduit into the additive manufacturing device and/or a storage container, in particular in combination with step a).

Optionally, in addition to the steps from a) to d), the method comprises at least one of the following further steps, preferably all of the following further steps:

e) determining the degree of fluidization of the first and/or second powder component; and f) controlling the operating parameters for mixing the first and/or the second component as a function of the determined degree of fluidization.

The steps from a) to f) are also characterized by the operating parameters by which the operating modes are characterized. For example, the introduction of the gas into the fluidization zone(s) is characterized by a gas pressure at which the gas is introduced, time intervals at which the gas is introduced, and a cycle between these time intervals. Filling (step b) is characterized, for example, by the speed at which the powder components and/or the powder mixture are introduced through the powder conduit, or by the filling speed of the first and/or the second container. Conveying (step d) is characterized by the discharge speed of the powder components and/or of the powder mixture through the discharge opening of the first container and/or through the powder opening of the second container. In particular, if the powder mixing is carried out in a circuit, step d) is also characterized by the filling speed of the first and/or the second powder container. Mixing (step c) is characterized, for example, by a certain time interval in which the mixing is performed. The operating parameters by which the introduction of a gas (step a) is characterized can also characterize the mixing (step c), in particular when the mixing of the powder component is realized or facilitated by the introduction of a gas. The discharge speed and the filling speed (operating parameters of step d and of step b) can also characterize the mixing (step c).

The introduction of a gas through the first and/or second fluidization zone in step a) is preferably carried out at least temporarily. However, it is also possible that no gas is introduced through at least one of the two fluidization zones at least temporarily. The introduction of a gas can be controlled as a function of the determined degree of fluidization, in particular the duration of the introduction and/or the gas pressure at which the gas is introduced can be controlled as a function of the determined degree of fluidization. The operating parameters are controlled by the control arrangement. For example, the duration of the introduction and/or the gas pressure can be increased if the determined degree of fluidization is too low, i.e., below a predefined lower threshold value. Conversely, the duration of the injection and/or the gas pressure can be decreased if the determined degree of fluidization is too high, i.e. above a predefined upper threshold value.

The introduction of the first and/or second powder component (step b) can be carried out separately for each powder component. Alternatively, the two powder components can also be introduced simultaneously or together, for example in a pre-mixed state that does not correspond to the degree of mixing to be achieved by the mixing device. The filling can be carried out, for example, as described above in relation to the mixing device, by supplying the first and/or second powder component via a powder conduit from an external powder supply. Preferably, step b) corresponds to the above-described "filling" operating mode of the mixing device. The supply speed of the first and/or the second powder component into the first and/or the second container can be changed and/or controlled depending on the degree of fluidization. This can be combined with the control and/or detection of the discharge speed of the first and/or the second powder component from the first and/or the second container.

When mixing the first and second powder components in step c), the first and/or second powder components are preferably conveyed in a circuit, as described above. Preferably, step c) corresponds to the above-described "mixing" operating mode of the mixing device. Preferably, step c) is carried out until a predetermined degree of mixing of the first and second powder components is achieved and/or during a predetermined period of time. The degree of mixing may be correlated to the degree of fluidization. For example, a predetermined degree of mixing may be achieved when a predetermined degree of fluidization of the first powder component and/or the second powder component and/or the powder mixture is present.

Step d) preferably corresponds to the above-described "conveying" operating mode of the mixing device.

In the determination (step e), the degree of fluidization is determined. The determination is based, for example, on the measurement of the viscosity of the first and/or the second powder component and/or the moisture content in the first and/or the second powder component. Alternatively or additionally, the temperature of the first and/or the second powder component can be measured. The viscosity and/or the moisture content and/or the temperature are preferably measured at the discharge opening of the first container. Alternatively or in addition, they can also be measured in the powder conduit and/or at the powder opening of the second container. In a further preferred embodiment, the viscosity and/or the moisture content and/or the temperature are measured in the first and/or in the second container. The determination (step e) can be performed with a specific (predefined and/or automatically derived in the running process) cycle and for a specific (predefined and/or automatically derived in the running process) duration.

In controlling (step f), at least some of the operating parameters characterizing the other steps are adjusted and/or changed. Preferably, the operating parameters are adjusted in correlation with the result from determining the degree of fluidization (step e). The measured viscosity and/or the measured degree of moisture and/or the measured temperature can provide indications about the efficiency of the other process steps. Based on the indication about the efficiency of these process steps, the corresponding operating parameters can be adjusted to make the process steps more efficient. For example, a high viscosity can mean that the first and second powder components are not sufficiently mixed or not sufficiently homogeneously mixed together. If a high viscosity is measured, the first and/or the second powder components can be mixed longer (step c). Alternatively or additionally, gas can be introduced for a longer period of time and/or at faster timed intervals (step a). The pressure at which the gas is introduced into the fluidization zone can likewise become stronger or weaker.

The method steps from a) to f) can be correlated and/or coupled with each other. For example, they may be carried out in a predetermined sequence. Furthermore, some process steps may be carried out instead of others or may be carried out repeatedly. Preferably, the process steps are not carried out in a fixed sequence, but depending on the development of the process conditions. Further, different process steps may be carried out simultaneously.

For example, the determination of the degree of fluidization (step e) can be carried out substantially simultaneously with the introduction of the gas into the fluidization zone(s). If the introduction of the gas occurs with a timed cycle, the determination of the degree of fluidization may occur with a cycle correlated thereto. For example, the degree of fluidization may be determined during the time intervals in which the introduction of the gas into the fluidization zone(s) is stopped. Alternatively, the degree of fluidization may be determined during the same time intervals in which the gas is introduced into the fluidization zone(s). Further, the degree of fluidization may be implemented immediately after carrying out the introduction of the gas into the fluidization zone(s).

Furthermore, determining the degree of fluidization (step e) may be coupled and/or correlated with mixing (step c). For example, the degree of fluidization can be determined after a certain time interval during which the powder components are mixed together. If the mixing is realized and/or facilitated by the introduction of a gas into the fluidization zone(s), the determination of the degree of fluidization and the introduction of the gas can be coupled according to the description for the correlation between steps a) and e).

The conveying (step d) and/or the mixing (step c) may be combined and/or coupled with each other and with the determination (step e). For example, mixing may be interrupted and conveying may be initiated depending on the determined degree of fluidization.

Filling (step b) and conveying (step d) can be combined with each other, in particular when powder mixing is performed in a circuit.

Furthermore, the controlling (step f) is combined/coupled with all other process steps, in that the controlling changes/adjusts the operating parameters of the other process steps, preferably depending on the measured degree of fluidization.

BRIEF DESCRIPTION OF THE DRAWINGS

Further features and expediencies of the invention will be apparent from the description of exemplary embodiments with the aid of the accompanying drawings.

FIGS. 4a to 4c are schematic views of the mixing device shown in FIGS. 2 and 3 in first, second, and third operating states.

DETAILED DESCRIPTION OF THE EMBODIMENTS

Figure 1:
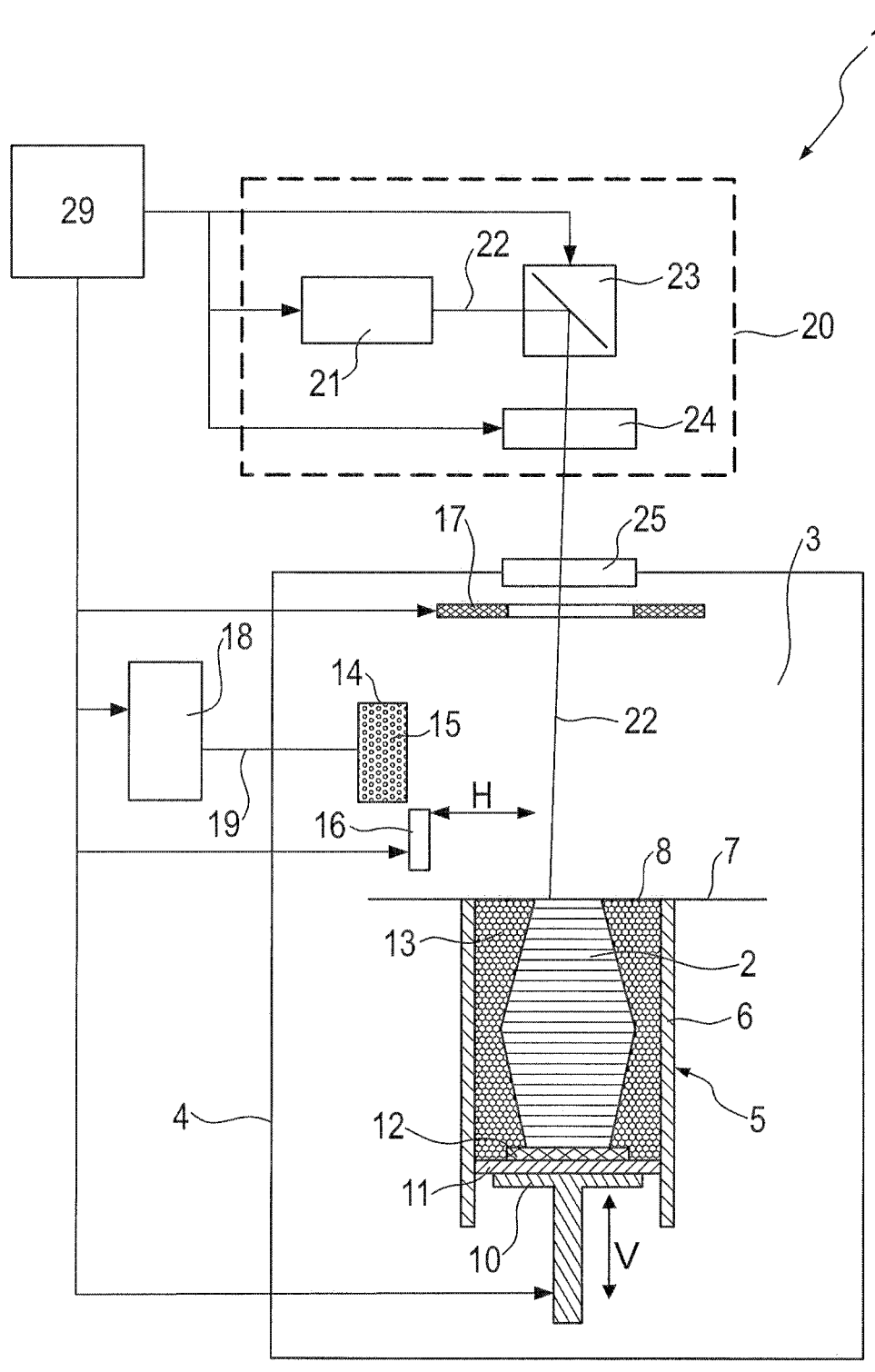
FIG. 1 is a schematic view, partially in cross-section, of a device for additive manufacturing of a three-dimensional object with a mixing device according to an embodiment of the present invention.

In the following, an embodiment of an additive manufacturing device with a mixing device according to the invention is described with reference to FIG. 1. The device shown in FIG. 1 is designed, by way of example only, as a laser sintering or laser melting device 1. For building an object 2, it contains a process chamber 3 with a chamber wall 4.

A container 5 open to the top and having a container wall 6 is arranged in the process chamber 3. A working plane 7 is defined by the upper opening of the container 5, wherein the area of the working plane 7 located within the opening, which can be used for building the object 2, is referred to as a build area 8.

A support 10 movable in a vertical direction V is arranged in the container 5, to which support a base plate 11 is attached that closes the container 5 to the bottom and thus forms the bottom thereof. Optionally, a building platform 12 is provided on the base plate 11, the building platform 12 or the base plate 11 serving as a building base on which the object 2 is built. In FIG. 1, the object 2 to be formed in the container 5 on the building platform 12 is shown below the working plane 7 in an intermediate state with several solidified layers surrounded by building material 13 that has remained unsolidified.

The laser sintering device 1 further comprises a storage container 14 for a building material 15 in powder form that is solidifiable by electromagnetic radiation. For providing the building material 15 in powder form, in particular a powder mixture of a first and a second powder component, a mixing device 18 is provided, which is described in more detail below with reference to FIGS. 2 and 3. The mixing device 18 is provided outside the process chamber 3 in the embodiment of the laser sintering device 1 shown in FIG. 1, but it can also be provided at least partially inside the process chamber 3. The mixing device 18 is connected to the storage container 14 via a removal conduit 19, for example a pipeline, to supply building material 15 in powder form from the mixing device 18 to the storage container 14. The mixing device 18 may be formed at least partially integrally with the manufacturing device 1, i.e. provided therein, or formed separately from the laser sintering device 1, i.e. provided externally thereto.

Various types of powders, in particular mixed powders, can be used as building material, in particular metal powders, plastic powders, ceramic powders, sand or filled powders. Instead of powder, other suitable materials can also be used as a building material, which materials contain at least a powder mixture provided by the mixing device.

The laser sintering device 1 further comprises a recoater 16 movable in a horizontal direction H for applying the building material 15 within the build area 8. Preferably, the recoater 16 extends transversely to its direction of movement over the entire area where building material is to be applied. Optionally, a radiation heater 17 is arranged in the process chamber 3 for heating the applied building material 15.

The laser sintering device 1 further includes an irradiation device 20 having a laser 21 that generates a laser beam 22 that is deflected via a deflection device 23 and focused onto the working plane 7 by a focusing device 24 via a coupling window 25, which is provided on the upper side of the process chamber 3 in the chamber wall 4.

Further, the laser sintering device 1 includes a control unit 29 via which the individual components of the device 1 are controlled in a coordinated manner to implement the build process. Alternatively, the control unit may be arranged partially or entirely outside the device. The control unit may include a CPU whose operation is controlled by a computer program (software). The computer program may be stored separately from the device on a storage medium from which it can be loaded into the device, in particular into the control unit.

In operation, building material 15 in powder form is supplied to the storage container 14 from the mixing container 18 via the removal conduit 19. The building material 15 in powder form is mixed in advance in the mixing container 18, preferably mixed from two or more different powder components. The mixing of the building material in powder form and its supply to the storage container 14 is described in more detail below with reference to FIGS. 4a-c and FIG. 6.

Then, in order to apply a powder layer, the support 10 is lowered by an amount that corresponds to the desired layer thickness and the recoater 16 moves to the storage container 14 and receives therefrom an amount of the building material 15 sufficient to apply a layer. It then moves across the build area 8, there applies pulverulent building material 15 to the building base or to a powder layer already present, and draws it out to form a powder layer. Optionally, the pulverulent building material 15 is heated to a working temperature by means of a radiation heater 17. Then, the cross-section of the object 2 to be manufactured is scanned by the laser beam 22 so that the pulverulent building material 15 is solidified at the locations that correspond to the cross-section of the object 2 to be produced. These steps are repeated until the object 2 is completed and can be removed from the process chamber 3.

In the following, the mixing device 18 is described in more detail with reference to FIGS. 2 and 3. The mixing device 18 comprises, for receiving at least a first and/or second powder component, a first container in the form of an outer container 30 and a second container in the form of an inner container 40 that is arranged within the outer container 30, i.e. in its interior. The outer container may be designed to be movable, for example attached to or on a displacement device 35 having rollers, wheels, rails or the like.

The outer container 30 is laterally bounded by a container wall 31, towards its upper side it is bounded by a container lid 32, and towards its lower side it is bounded by a lower boundary in the form of a container bottom 33. The container lid 32 is designed in such a way that in a closed position it closes the outer container 30 in a powder-tight manner towards its upper side and in an open position it uncovers or opens the outer container 30 towards its upper side at least partially, preferably completely. The container bottom 33 of the outer container 30 is preferably funnel-shaped and has a discharge opening 34 for discharging the first and/or second powder component.

The inner container 40 is laterally bounded by a container wall 41 and is bounded towards its lower side by a lower boundary in the form of a container bottom 42. The container bottom 42 of the inner container 40 is preferably funnel-shaped and has a powder opening 43 for discharging the first and/or second powder component. Towards its upper side, the inner container 40 is at least partially, preferably completely, open and has on its upper side an upper boundary in the form of a container rim 44. The inner container 40 extends over a height h between its lowest point, in FIG. 2 the powder opening 43, and its container rim 44.

Figure 2:
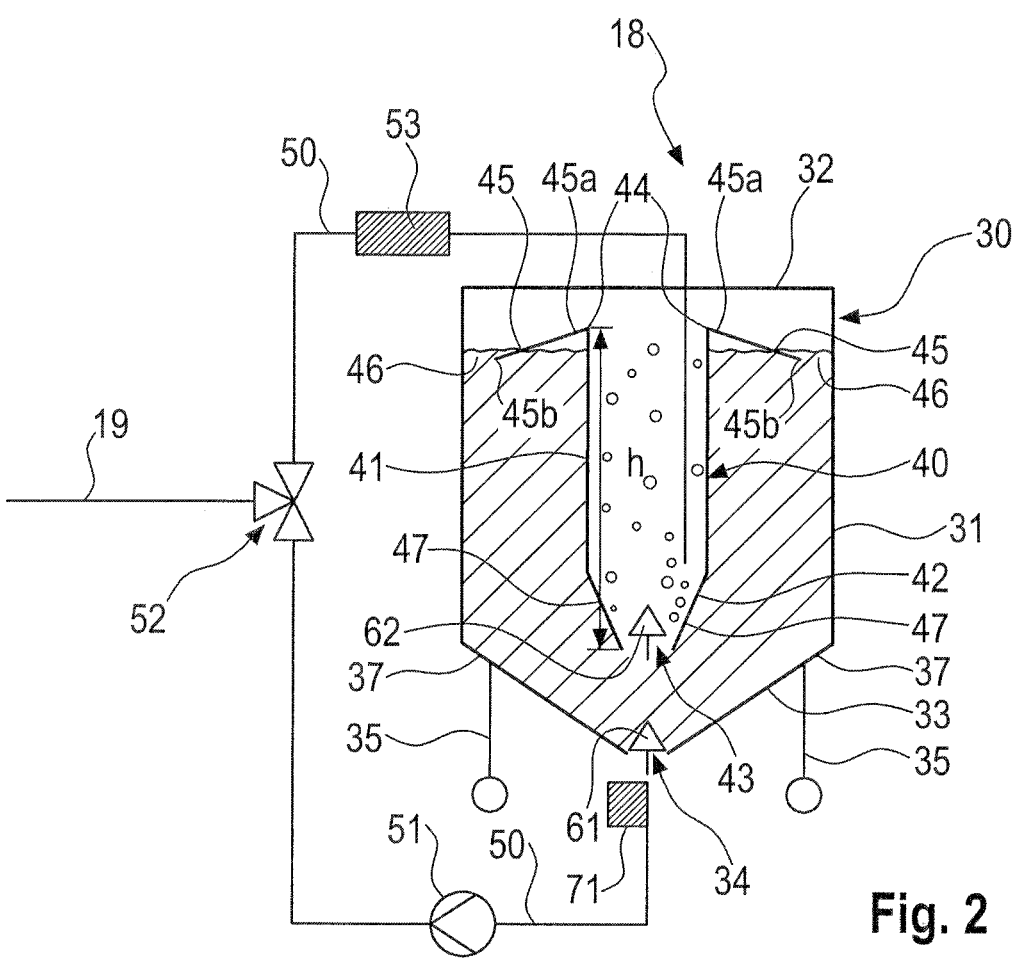
FIG. 2 is a schematic view of the mixing device shown in FIG. 1 in cross-section.

In FIG. 2, the inner container 40 is spaced apart from the outer container 30 in substantially all spatial directions and is positioned substantially centrally. The two container walls 31, 41, the two container bottoms 33, 42, and the two upper boundaries (i.e., the container lid 32 and the container rim 44) of the two containers 30, 40 are each spaced apart. Preferably, the inner container 40 is spaced apart from the outer container 30 in at least one spatial direction. In at least one other direction, the inner container 30 may at least partially abut, preferably be attached, to a wall of the outer container.

A deflecting element in the form of a deflecting plate 45 is provided on the container wall 41 of the inner container 40, preferably on its container rim 44. The deflecting plate 45 is preferably arranged without a gap on the container wall 41 and extends outwardly from a first end 45a on or near the container wall 41 to a second end 45b, i.e., toward the container wall 31 of the outer container 30. In the vertical direction, the first end 45a of the deflecting plate is provided above the second end 45b so that the deflecting plate 45 is inclined downwardly, i.e., in the direction of the container bottom 33 or the discharge opening 34 of the outer container 30. The second end 45b of the deflecting plate 45 is preferably provided at a distance from the container wall 31 of the outer container 30, so that a gap 46 is provided between the container wall 31 of the outer container 30 and the deflecting plate 45. This gap 46 is sized to allow the first and/or second powder component to pass through. Preferably, the deflecting plate 45 extends around the entire circumference of the inner container (not shown in FIG. 2).

The outer container 30 and the inner container 40 comprise a fluidization zone 37 and 47, respectively. Although the present exemplary embodiment comprises fluidization zones 37, 47 in both the outer container 30 and the inner container 40, it is substantial in the context of the present invention, because it is particularly advantageous and effective, that the inner container 40 comprises a fluidization zone.

Figure 3:
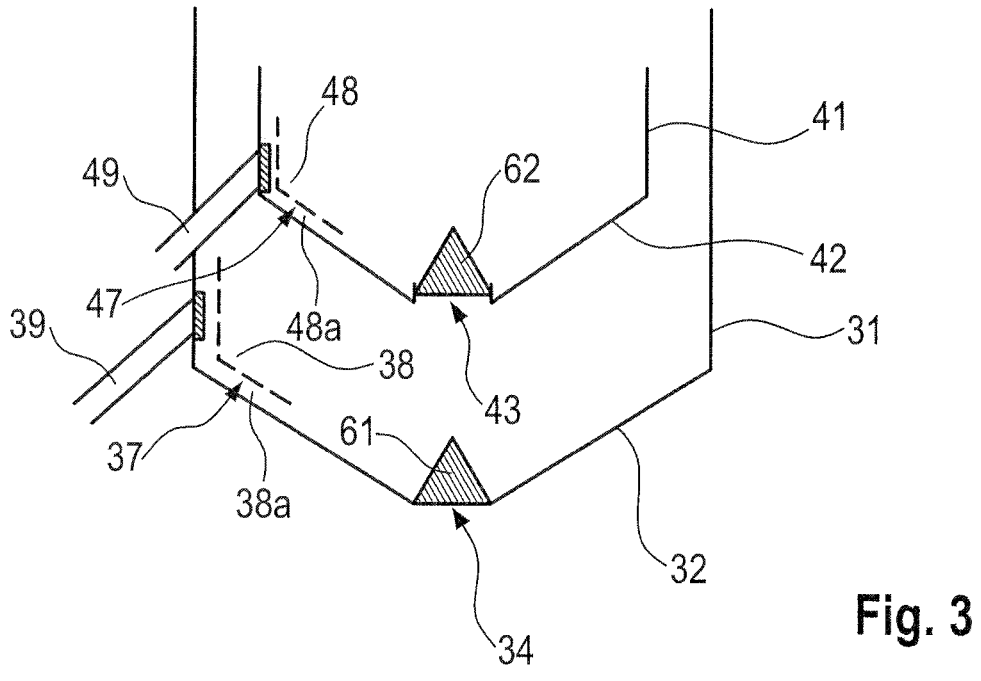
FIG. 3 is a schematic view of a lower region of an inner container and an outer container of the mixing device shown in FIG. 2.

As can best be seen from FIG. 3, the fluidization zone 37 of the outer container 30 and the fluidization zone 47 of the inner container 40 are formed by a gas introduction element 38 and 48, respectively, for example a grid or a porous plate. The fluidization zones 37 and 47 are provided at a distance from the container bottom 42 and 33, respectively. Cavities 38a and 48a are formed between the respective gas introduction element 38 and 48 and the container bottom 33 and 42, respectively, and are in gas-conducting communication with a gas supply line 39 and 49. The gas introduction elements 38 and 48 are designed, or the gaps of the grid or the pores of the porous plate are dimensioned, such that gas introduced into the cavity 38a and 48a via the gas supply line 39 and 49 passes through the gas introduction element 38 and 48, or the gaps of the grid or the pores of the porous plate, respectively, into the outer container 30 and the inner container 40, but no building material in powder form (i.e., the first and second powder components) can escape from the outer container 30 and from the inner container 40 through the gas introduction elements. The gaps of the grid or the porous plates form a specific angle with the main extension direction of the grid or the porous plates or the gas introduction element 38 and/or 48. Preferably, the gaps are perpendicular or parallel to the main extension direction of the grid or the porous plates or the gas introduction element 38 and/or 48. The fluidization zone 37 and the fluidization zone 47 may extend over the entire walls 31 and 41 or may be formed only in sections thereon. Preferably, as shown in FIG. 3, the fluidization zones are located at the edge of a funnel-shaped boundary of the outer container and the inner container. Preferably, the gas supply lines 39 and 49 are in communication with a gas reservoir not shown in the figures. The gas reservoir may in particular be provided outside the outer container 30, and the gas supply lines 39 and 49 may for this purpose extend through the container walls 31 and 41, for example. The gas reservoir (not shown) may be in communication with a moistening device (not shown). The moistening device enables the introduced gas to be enriched with moisture, i.e. water or water vapor.

Further, the mixing device 18 comprises a first closure device 61 that is designed to selectively close or open the discharge opening 34 of the outer container 30. Further, a second closure device 62 is provided that is designed to selectively close or open the powder opening 43 of the inner container 40. The closure devices 61, 62 can be designed, for example, as valves. The closure devices 61, 62 can be manually actuatable by a user, but preferably they are automatically actuatable, in particular controllable by a control unit of the mixing device (not shown in the figures) or by the control unit of the laser sintering device 1 (see FIG. 1). In FIGS. 2 and 3, the closure devices 61, 62 are shown in a closed state, in which they close the discharge opening 34 and the powder opening 43, respectively.

As shown in FIG. 2, the container rim 44 of the inner container 40 is provided spaced apart from the container lid 32 when the container lid 32 closes the outer container 30 toward its upper side. Further, the container wall 41 of the inner container is provided spaced apart from the container wall 31 of the outer container 30, and the container bottom 42 of the inner container 40 is spaced apart from the container bottom 33 of the outer container 30. Further, in FIGS. 1 and 2, the inner container 40 is shown substantially centered within the outer container 30. Preferably, the inner container 40 is spaced apart from the outer container 30 in at least one spatial direction. In at least one other direction, the inner container 40 may at least partially abut, preferably be attached, to a wall 31 of the outer container.

Further, the mixing device 18 comprises a powder conduit 50, for example formed as a pipeline, which connects to the discharge opening 34 of the outer container 30 for discharging the first and/or second powder component from the outer container 30. The powder conduit 50 extends outside the outer container 30 to its container lid 32 and through the container lid 32 into the inner container 40. Preferably, the powder conduit 50 extends up to a lower region of the inner container 40, in particular to a lower half, further preferably a lowest third of the inner container 40 with respect to its height h.

A pump 51, in particular a pneumatic powder pump, is provided in or on the powder conduit 50 in order to convey powder in the powder conduit 50. The pump 51 can be designed for intermittent or continuous conveyance of the powder in the powder conduit 50. The pump can be formed as part of the mixing device 18, as shown in FIG. 2, or can be provided separately from the mixing device 18 as an external pump, for example as part of a conveyor module.

Further, the powder conduit 50 is connected to the removal conduit 19 via a valve 52 to allow powder to be supplied from the mixing device 18 to the storage container 14 (see FIG. 1). The valve 52 is designed to selectively supply powder discharged through the discharge opening 34 of the outer container 30, i.e. the first and/or second powder component, through the powder conduit 50 to the inner container 40 of the mixing device 18 or through the removal conduit 19 to the storage container 14 of the manufacturing device 1. For example, the valve 52 can be designed as a directional control valve, in particular as a 3-2-directional valve.

Further, a moistening device 53 is optionally provided in the powder conduit 50 for moistening the powder conveyed through the powder conduit 50, i.e. for increasing its moisture content. Alternatively or in addition to the moistening device 53, the gas introduced into the inner container 40 through the fluidization zone 47 can be moistened.

The mixing device 18 preferably comprises at least one sensor arrangement 71 which is suitable for determining a degree of fluidization of the powder components and/or of the powder mixture. Further preferably, the sensor arrangement is connected to a transmission unit (not shown in the figures), which is designed to transmit the measured degree of fluidization. This transmission unit may be integrated in the sensor unit, or the sensor arrangement may additionally be configured to transmit the measured degree of fluidization. The degree of fluidization can be determined based on a measurement of the viscosity and/or the moisture content and/or the temperature of the powder components and/or of the powder mixture. Accordingly, the sensor arrangement can comprise a viscometer (rheometer) and/or a moisture sensor and/or a temperature sensor. In FIG. 2, the sensor arrangement 71 is arranged at the discharge opening 32 of the outer container 30. Deviating from the illustration in FIG. 2, the sensor arrangement 71 can also be arranged in or on the powder conduit 50 and/or at the powder opening 42 of the second container 40. The sensor arrangement 71 can also be arranged within the outer container 30 and/or the inner container 40. For example, several sensor arrangements 71 may also be provided in the mixing device 18.

Preferably, the mixing device 18 comprises a control unit (not shown in the figures) connected to at least one, preferably all, other components of the mixing device. In particular, the control unit is connected to the sensor arrangement 71. The control unit can, for example, be provided (by the transmission unit or by the sensor arrangement) with the degree of fluidization. The control unit can further be configured to compare the determined degree of fluidization with a specific limit or to calculate the relative change of the degree of fluidization over a certain time interval. Depending on the degree of fluidization, in particular depending on the result from this comparison or from this calculation, the control unit can generate commands and transmit them to the other components so that the operating parameters of the other components are changed. For example, the control unit 29 of the laser device (see FIG. 1) can also be the control unit of the mixing device. Alternatively, the control unit 29 of the laser device can comprise the control unit of the mixing device, or vice versa. Components of the mixing device that are controllable by the control unit can be, for example, the pump 51 of the powder conduit 50 shown in FIG. 2, and/or the moistening device 53, and/or the closure devices 61, 62, and/or a gas conveying device not shown in the figures, which controls a gas supply to the fluidization zones 37, 47.

The closure devices 61, 62 can be brought into three different operating states, preferably depending on each other, which are shown in FIGS. 4a, 4b and 4c. FIG. 4a shows a first operating state in which the discharge opening 34 of the outer container 30 is closed by the first closure device 61, and the powder opening 43 of the inner container 40 is closed by the second closure device 62. In this first operating state, substantially no powder can enter the outer container 30 from the inner container 40 through the powder opening 43. Similarly, substantially no powder can enter the powder conduit 50 from the outer container 30 through the discharge opening 34. In this first operating state, the mixing device can be operated, for example, in a "filling" operating mode (see below).

FIG. 4b shows a second operating state, in which the powder opening 43 of the inner container 40 is closed by the second closure device 62, and the discharge opening 34 of the outer container 30 is open, i.e. not closed by the first closure device 61. In this second operating state, powder from the outer container 30 can enter the powder conduit 50 through the discharge opening 34, but substantially no powder can enter the outer container 30 from the inner container 40 through the powder opening 43. In this second operating state, the mixing device can be operated, for example, in a "mixing" operating mode (see below).

FIG. 4c shows a third operating state, in which both the powder opening 43 of the inner container 40 and the discharge opening 34 of the outer container 30 are open. In this third operating state, powder can pass from the inner container 40 through the powder opening 43 into the outer container 30 and from the outer container 30 through the discharge opening 34 into the powder conduit 50. In this third operating state, the mixing device can be operated, for example, in a "conveying" operating mode (see below).

Figure 5A:
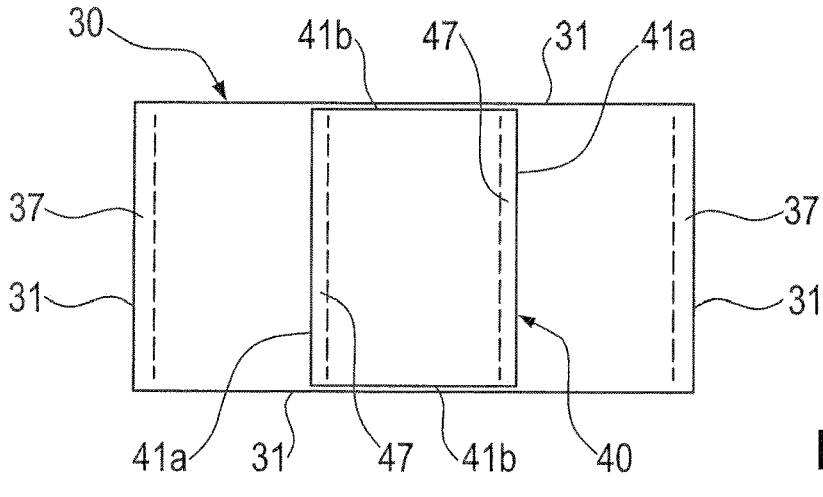
FIGS. 5a to 5c are schematic top views of the mixing device shown in FIGS. 2 and 3 according to various embodiments.
Figure 5B:
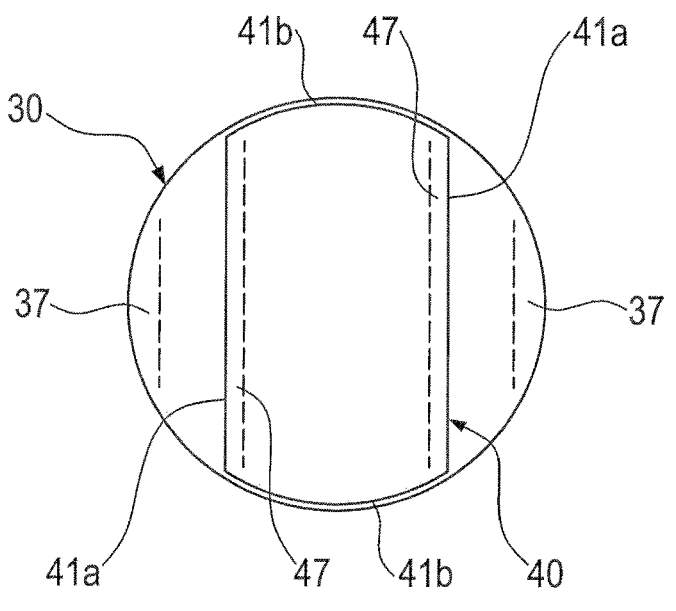
Figure 5C:
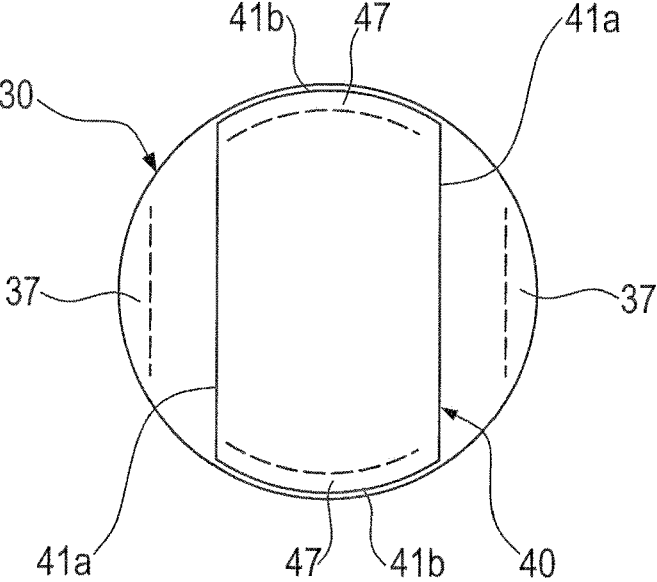
Figure 6:
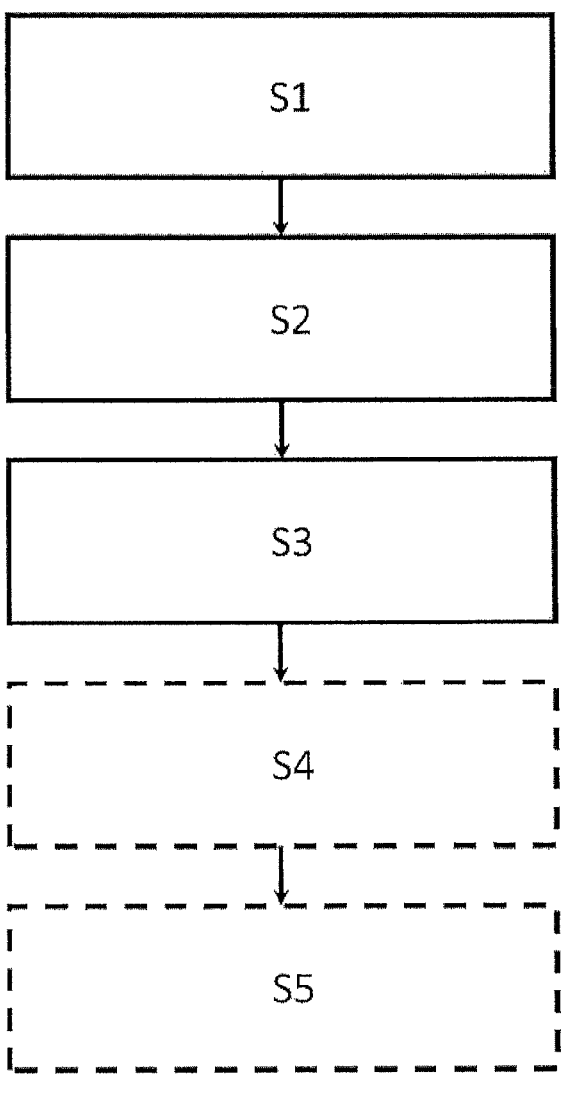
FIG. 6 schematically shows steps of a method according to the invention of producing a powder mixture using the mixing device shown in FIGS. 2 to 5c.

FIGS. 5a-5c show top views of the mixing device 18 according to further embodiments of the mixing device. In FIG. 5a, the outer container 30 and the inner container 40 are quadrangular. The walls 41a of the inner container 40 are spaced from the walls 31 of the outer container 30, while the walls 41b of the inner container 40 abut the walls 31 of the outer container 30. Preferably, the walls 41b of the inner container 40 are attached to the walls 31 of the outer container 30. The outer container 30 comprises two fluidization zones 37. Preferably, the fluidization zones 37 are arranged on the walls 31 that are spaced apart from the walls 41a of the inner container 40. The inner container 40 comprises two fluidization zones 47 arranged on the walls 41a that are spaced apart from the walls 31 of the outer container 30 in FIG. 5a. The fluidization zones 47 of the inner container 40 can also be arranged on the walls 41b that abut the walls 31 of the outer container 30. In FIG. 5b and FIG. 5c, the outer container 30 is round. The inner container 40 has two round walls 41b and two straight walls 41a. The two round walls 41b have the same curvature as the outer container 30, allowing the round walls 41b to abut the outer container 40. Preferably, the round walls 41b are attached to the outer container 30. Inside the outer container 30, two fluidization zones 37 are provided on the two walls 31 that are spaced apart from the walls 41a of the inner container. For example, two fluidization zones 47 can also be provided in the inner container. In FIG. 5b, they are arranged on the straight walls 41a of the inner container 40. In FIG. 5c, the fluidization zones 47 are arranged on the round walls 41b of the inner container 40. Although the outer container 30 and the inner container 40 in FIG. 5a, FIG. 5b and FIG. 5c have a quadrangular and round shape, respectively, they can have any other geometric shape.

Referring to FIGS. 4a-4c and FIG. 6, the operation of the mixing device 18 is described below. In a first step S1, which is also referred to as a "filling" operating mode of the mixing device 18, a first powder component and/or a second powder component, and optionally other powder component(s), are supplied to the mixing device. The first and second powder components preferably differ from each other in their chemical and/or physical properties. For example, in step S1, the first powder component can be supplied to the inner container 40 and the second powder component can be supplied to the outer container 30, but the two powder components can also be supplied in a mixed state to the outer and/or inner container. It is also possible that one of the two powder components is already present in the inner and/or outer container. To supply the powder components, for example, the container lid 32 of the outer container 30 can be opened and the first and/or second powder component can be manually supplied to the outer and/or inner container by a user. Alternatively or additionally, the first and/or second powder component can be supplied into the inner container 40 through the powder conduit 50 and/or a further supply conduit not shown in the figures. In doing so, preferably, the container lid 32 is in its closed position and gas is introduced through the fluidization zone 37 of the outer container 30 and/or the fluidization zone 47 of the inner container 40 to fluidize the supplied powder. During supplying of the first and/or second powder component (step S1), the closure devices 61, 62 can be in the first operating state described above with reference to FIG. 4a. This can prevent powder from escaping through the powder opening 43 and the discharge opening 34. Alternatively to the first operating state shown in FIG. 4a, the powder opening 43 of the inner container 40 can also be open to allow the first and/or second powder component to pass from the inner container 40 through the powder opening 43 into the outer container 30. Again, the discharge opening 34 is closed by the first closure device 61.

In a second step S2, which is also referred to as a "mixing" operating mode of the mixing device 18, the first powder component and the second powder component are mixed together in the mixing device 18. In this operating mode, the closure devices 61, 62 are provided in the second operating state described above with reference to FIG. 4b, and the pump 51 is active. In this operating mode, the valve 52 closes the removal conduit 19 and opens the powder conduit 50 leading into the inner container 40. Gas is introduced through the fluidization zone 37 into the outer container 30 and/or through the fluidization zone 47 into the inner container 40. Introduction of the gas may occur at predetermined time intervals and with a timed cycle, and the determination may occur with a cycle correlated thereto. Further, the gas may be introduced into the fluidization zones at a predetermined gas pressure. The introduction of the gas causes the powder contained in the outer container 30 and/or the inner container 40 to be in a fluid-like state. The introduction of a gas through the fluidization zone 47 causes powder to pass out of the inner container 40 over the container rim 44 of the inner container 40. The deflecting plate 45 causes the spilling fluidized powder to be directed outward, i.e., toward the container wall 31 of the outer container 30, and to pass through the gap 46 between the deflecting plate 45 and the container wall 31 of the outer container 30 in the outer container toward its container bottom 33, causing mixing with the powder present in the outer container 30. This type of mixing is facilitated when the powder opening 43 of the inner container 40 is closed by activating the closure device 62. The powder enters the powder conduit 50 through the discharge opening 34 and is conveyed through the powder conduit 50 by the pump 51 and supplied again to the inner container 30. Optionally, the powder is moistened in the powder conduit 50 by means of the moistening device 53 and/or in the inner container 40 by introducing a moistened gas. This second step S2 is carried out until a predetermined degree of mixing of the two powder components is achieved, and/or is carried out during a predetermined period of time. By circulating the powder through the powder conduit 50 and the inner and outer containers, a good mixing of the powder, i.e. a mixing of the two powder components, is thereby achieved. The achievement of a predetermined degree of mixing can be determined by determining a degree of fluidization. The determination of the degree of fluidization can optionally be performed according to the implementation of step S4.

Subsequently, in a third step S3, which is also referred to as a "conveying" operating mode of the mixing device 18, the mixed powder components are supplied to the storage container 14 (see FIG. 1) as building material 15 in powder form. Optionally, it is possible to switch from step S2 to step S3 when a predetermined degree of mixing or a predetermined degree of fluidization is reached. The degree of fluidization can be determined before or during the change from step S2 to step S3 according to the implementation of optional step S4. In this operating mode, the closure devices 61, 62 are provided in the third operating state described above with reference to FIG. 4c, and the pump 51 is active. In this operating mode, the valve 52 opens the removal conduit 19 and closes the powder conduit 50 leading into the inner container 40. Thus, powder present in the inner container 40 passes through the powder opening 43 into the outer container 30 and from the outer container 30 through the discharge opening 34 into the powder conduit 50, where it is supplied to the storage container 14 (see FIG. 1) via the removal conduit 19. This third step S3 is preferably carried out until a predefined powder filling level is reached in the storage container 14 and/or the mixing device 18, and/or during a predefined period of time.

In an optional step S4, a degree of fluidization of the first and/or the second powder component and/or the powder mixture is determined. The determination of the degree of fluidization is realized by a sensor arrangement. The determination of the degree of fluidization is based, for example, on the measurement of the viscosity of the first and/or the second powder component and/or the moisture content in the first and/or the second powder component. Alternatively or additionally, the temperature of the first and/or the second powder component can be measured. The viscosity and/or the moisture content and/or the temperature are preferably measured at the discharge opening 34 of the first container 30 by the sensor arrangement 71 in FIG. 2. The determining (step S4) may be performed at a specific cycle and for a specific duration. Further, the measuring may be coupled with the mixing (step S2). If the introduction of the gas during mixing (step S2) occurs with a timed cycle, the determining may occur with a cycle correlated thereto. For example, the determining may occur during the time intervals in which the introduction of the gas into the fluidization zone 37 and/or the fluidization zone 47 is stopped. Alternatively, the determining may occur during the same time intervals that the gas is introduced into the fluidization zone 37 and/or the fluidization zone 47. Coordinating between mixing (step 2) and determining (step 4), or switching from mixing (step 2) to determining (step 4), may be performed according to the implementation of step S5, "control".

In an optional step S5, at least some of the operating parameters used to implement the other steps (from step S1 to S4) are controlled. In addition, during the implementation of step S5, coordination or switching from one step to another may be initiated and/or occur. Preferably, the operating parameters are adjusted in correlation with the result from determining the degree of fluidization (step S4). Depending on and/or coordinated with the result from the determining (step S4), the operating parameters of mixing (step S2) are changed and/or adjusted. For example, the duration and/or the cycle of introducing the gas into the fuildization zones 37 and/or 47 (as in step S2) can be changed and/or adjusted depending on and/or coordinated with the result from the determination (step S4). Furthermore, the gas pressure at which the gas is introduced into the fluidization zone 37 and/or into the fluidization zone 47 may be changed and/or adjusted depending on and/or coordinated with the result from the determination (step S4). Furthermore, conveying (step S3) may be initiated when a sufficient degree of fluidization is subsequently obtained from the mixing (step S2). The degree of fluidization can be determined in the optional step S4. Conversely, conveying (step S3) can be interrupted and mixing (step S2) (re)initiated if an insufficient degree of fluidization is reached. Control is performed by a control unit (not shown) connected to the other components of the mixing device 18, or by the control unit 29 (see FIG. 1).

The invention is not limited to the embodiment of a mixing device described above. Rather, modifications and further developments are possible without departing from the subject matter of the present invention.

For example, the powder opening 43 of the inner container 40 and/or the discharge opening 34 of the outer container 30 do not have to be provided in the respective container bottom 42 or 33. For example, they can also be provided in a side region of the respective container, preferably they are provided in a lower region of the respective container. Also, the container bottoms 33, 42 do not have to be funnel-shaped; they can also be flat, for example, or have any other suitable shape. Likewise, the fluidization zone 47 shown in FIGS. 2 and 3 does not have to be formed in or on the container bottom 42 of the inner container 40. A fluidization zone may alternatively or additionally be also formed on or in another region of the inner container and/or the outer container, in particular a lower region of the respective container.

In the laser sintering or laser melting device 1 described above, the storage container 14 can also be provided integrally with the recoater 16, or the building material in powder form can be supplied directly to the recoater 16 from the mixing device 18 through the removal conduit 19.

According to a further development of the mixing device 18 described above, as an alternative or in addition to the fluidization zone 47 for introducing a gas into the inner container 40, a further fluidization zone not shown in the figures may be provided for introducing a gas into the outer container 30. This fluidization zone may, for example, be formed analogously to the fluidization zone of the inner container 40.

In the mixing device described above, the inner container 40 (generally: a second container) is provided in the outer container 30 (generally: a first container). Alternatively to this embodiment, a first and a second container can also be provided spatially separated, for example side by side, and the first and/or second powder component can be exchanged or circulated between the containers via corresponding structural elements, for example powder conduits or pipes.

Although the present invention has been described with reference to a laser sintering or laser melting device, it is not limited to laser sintering or laser melting. It can be applied to any method for the additive manufacturing of a three-dimensional object by layer-wise application and selective solidification of a building material comprising at least one powder mixture.

For example, the irradiation device of the additive manufacturing device may comprise one or more gas or solid state lasers or any other type of laser, such as laser diodes, in particular VCSEL (Vertical Cavity Surface Emitting Laser) or VECSEL (Vertical External Cavity Surface Emitting Laser), or a line of such lasers. In general, the irradiation device may be any device capable of selectively applying energy as wave or particle radiation to a layer of the building material, such as another light source, an electron beam, or any other energy or radiation source capable of solidifying the building material. Instead of deflecting a beam, irradiation with a movable line irradiation device can also be applied. The invention can also be applied to selective mask sintering, where an extended light source and a mask are used, or to high-speed sintering (HSS), where a material that increases (absorption sintering) or decreases (inhibition sintering) radiation absorption at the respective locations is selectively applied to the building material, and then exposed non-selectively over a large area or with a movable line irradiation device.

Instead of introducing energy, selective solidification of the applied building material can also be performed by 3D printing, for example by applying an adhesive. In general, the invention relates to additive manufacturing of an object by means of layer-wise application and selective solidification of a building material regardless of the manner in which the building material is solidified.

Instead of a building material in powder form, a suitable other building material, for example a paste-like building material, can also be used, which contains at least a powder mixture provided by the mixing device described above.

The invention claimed is:

1. A mixing device for producing a powder mixture of a first powder component and at least one second powder component for an additive manufacturing device in which a three-dimensional object can be produced by layer-wise selective solidification of a building material comprising the powder mixture, the mixing device comprising:

a first container for receiving the first and/or the second powder component, wherein the first container provides a discharge opening for discharging the first and/or the second powder component at a bottom of the first container;

a second container for receiving the first and/or the second powder component, wherein the second container is arranged within the first container; and a powder conduit that connects to the discharge opening at the bottom of the first container and is guided through the top of the second container into the second container:

wherein the second container is designed to be at least partially open at its top; and wherein the first container comprises at least one fluidization zone for introducing a gas into the first container.

2. The mixing device of claim 1, wherein the first container is closable towards an upper side by a container lid and wherein the second container is provided within the first container such that an upper boundary of the second container is spaced apart from the container lid of the first container and wherein the powder conduit extends through the container lid of the first container into the second container.

3. The mixing device of claim 1, wherein the second container provides a powder opening for discharging the first and/or the second powder component at a lower boundary of the second container.

4. The mixing device of claim 3, further comprising at least a first closure device that is designed to close and/or open the discharge opening of the first container, and/or at least a second closure device that is designed to close and/or open the powder opening of the second container.

5. The mixing device of claim 4, wherein the first closure device and the second closure device are designed to close and/or open the respective discharge opening or powder opening depending on an operating state of respective other closure device and/or depending on a defined operating mode of the mixing device.

6. The mixing device of claim 5, wherein the mixing devices defines at least one of following operating states:

a first state in which the discharge opening of the first container is open and the powder opening of the second container is closed;

a second state in which the discharge opening of the first container is closed and the powder opening of the second container is open; and/or a third state in which the discharge opening of the first container and the powder opening of the second container are both closed or both open.

7. The mixing device of claim 1, wherein the bottom of the first container and/or a lower boundary of the second container is/are funnel-shaped at least in sections thereof, and wherein the discharge opening connects to a conveyor module.

8. The mixing device of claim 1, wherein the second container is coupled to at least on one wall of the first container.

9. The mixing device of claim 1, wherein the second container provides at least one deflecting element extending substantially from an upper boundary of the second container in a direction of at least one nearest wall of the first container; and wherein the deflecting element is inclined from the upper boundary of the second container towards the bottom of the first container.

10. The mixing device of claim 1, wherein the first and/or second container can be filled manually or and/or partially automatically and/or automatically, via the powder conduit, and/or wherein the powder conduit is connected to a removal conduit for removing the powder mixture from the mixing device.

11. The mixing device of claim 1, further comprising a moistening device designed and/or arranged and/or adjusted for moistening the first and/or second powder component, in the powder conduit and/or in the fluidization zone.

12. An additive manufacturing device for manufacturing a three-dimensional object by selective solidification of a building material layer by layer, wherein the building material comprises the powder mixture provided by the mixing device of claim 1; and/or wherein the manufacturing device comprises and/or is connected to the mixing device of claim 1.

13. A mixing device for producing a powder mixture of a first powder component and at least one second powder component for an additive manufacturing device in which a three-dimensional object can be produced by layer-wise selective solidification of a building material comprising the powder mixture, the mixing device comprising:

a first container for receiving the first and/or the second powder component, wherein the first container provides a discharge opening for discharging the first and/or the second powder component at a bottom of the first container;

a second container for receiving the first and/or the second powder component; and a powder conduit that connects to the discharge opening of the first container and is guided into the second container, wherein the second container is designed to be at least partially open towards an upper side; and wherein the first container comprises at least one fluidization zone for introducing a gas into the first container, the at least one fluidization comprising a cavity and a porous plate or a grid for passing the gas from the cavity into the first container.

14. A mixing device for producing a powder mixture of a first powder component and a second powder component for an additive manufacturing apparatus producing objects by layer-wise solidification of the powder mixture, the mixing device comprising:

a first container and a second container, the first container having a first container interior receiving the first powder component;

the second container having a second container interior receiving the second component;

a mixing conduit connecting the first and second container interiors, the mixing conduit extending from a first outlet in a bottom of the first container interior to the second container interior;

a drive moving powder through the mixing conduit;

a fluidizing mechanism communicating with the second container interior, the fluidizing mechanism percolating gas through first and second powder components in the second container interior to intermingle the first and second powder components;

a second outlet in a bottom of the second container interior;

a first valve opening and closing the first container outlet;

a second valve opening and closing the second outlet, the second valve communicating with the first container interior; and a third valve located in the mixing conduit, the third valve having a mixing position wherein powder material flows through to the second container interior, and a mixed powder transfer position wherein mixed powder material is transferred out of the mixing device.

15. The mixing device of claim 14, wherein the second container is located within the first container interior, the second valve emptying into the first container adjacent the bottom of the first container interior.

16. The mixing device of claim 15, wherein the fluidizing mechanism comprises a second container zone within the second container interior having a plurality of outlets for gas to pass out of the second container zone.

17. The mixing device of claim 16, wherein the fluidizing mechanism further includes a first container zone within the first container interior having a plurality of outlets for gas to pass out of the first container zone.

18. The mixing device of claim 16, wherein the second container zone fluidizes the first powder component and the second powder component to exit the second container through an opening in a top of the second container and into the first container interior.

19. The mixing device of claim 18, further including a deflator plate spaced above the opening, a deflector plate arranged to direct the first powder component and the second powder component into the first container interior.

* * * * *